United States Patent
Buehler et al.

[11] 3,750,046
[45] July 31, 1973

[54] SILVER-DOPED CADMIUM TIN PHOSPHIDE LASER

[75] Inventors: Ernest Buehler, Chatham; Joseph Leo Shay, Marlboro; Jack Harry Wernick, Madison, all of N.J.

[73] Assignee: Bell Telephone Laboratories, Incorporated, Murray Hill, N.J.

[22] Filed: Sept. 13, 1971

[21] Appl. No.: 179,906

[52] U.S. Cl...... 331/94.5 H, 252/301.6, 313/108 D, 317/234 R
[51] Int. Cl............................................. H01s 3/00
[58] Field of Search............................. 331/94.5 H; 313/108 D; 317/235; 252/301.4, 301.6

[56] References Cited
OTHER PUBLICATIONS

Goryanova et al., Physica Status Solidi A, Vol. 1, No. 4, pp. K161–163, 1970.

Brancie–Guillot et al.: Comptes Revdus Acad. Sci. Paris, vol. 286 B, pp. 135–138, 1969.

Primary Examiner—Ronald L. Wibert
Assistant Examiner—Edward S. Bauer
Attorney—R. J. Guenther, W. L. Keefauver et al.

[57] ABSTRACT

There is disclosed a semiconductor laser employing silver-doped cadmium tin phosphide, from which unexpectedly low-threshold and efficient laser action has been obtained. Both optically pumped and current injection embodiments are disclosed. Laser oscillation occurs in a narrow band that is temperature dependent but ranges from about 1.012 micrometers to about 1.016 micrometers.

6 Claims, 4 Drawing Figures

SILVER-DOPED CADMIUM TIN PHOSPHIDE LASER

BACKGROUND OF THE INVENTION

This invention relates to semiconductor lasers.

There has been a continuing search for semiconductor lasers that will efficiently emit narrow-band coherent light. While many electron beam pumped lasers and optically pumped lasers have been demonstrated in various semiconductive materials, it has been extremely difficult to find a semiconductive laser in which current injection is feasible and in which the lasing threshold and efficiency would make it competitive with the proven gallium arsenide laser.

The diamond-like ternary compound cadmium tin phosphide ($CdSnP_2$), having the tetragonal chalcopyrite structure, is one of a number of arsenides and phosphides having energy gaps in the near-infrared and visible regions of the spectrum. For cadmium tin phosphide, laser action has previously been observed at a wavelength of 1.01 micrometers when pumped by an electron beam. Further, the room temperature bandgap lies close to the 1.06 micrometer Nd:YAG laser emission, thereby making it useful as a room temperature detector and for other optical devices, such as limiters and passive Q-switches, as disclosed in the copending patent application of R. F. Leheny and J. L. Shay, U.S. Pat. Ser. No. 21,852, filed Mar. 23, 1970 and assigned to the assignee hereof.

Nevertheless, these prior results have not indicated that a competitive semiconductor injection laser could be achieved in this material.

SUMMARY OF THE INVENTION

We have discovered that a semiconductor laser employing silver-doped cadmium tin phosphide has an unexpectedly low threshold and unexpectedly high efficiency of laser action.

According to a specific feature of our invention, the melt from which the laser crystals are grown contains between 0.1 mol percent and 1.0 mol percent of silver and a large excess of tin. Whereas undoped cadmium tin phosphide is n-type with a resistivity of typically 0.1 ohm centimeter, our silver-doped cadmium tin phodphide laser crystals are typically n-type in at least a portion thereof with resistivity of about 1 ohm-centimeter.

The role that silver plays in reducing the threshold for laser action and increasing efficiency is at present unknown.

Various species of our invention include optically pumped species and injection species in which the silver dopant is present on either or both sides of the p-n junction.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENTS

Figure 1:
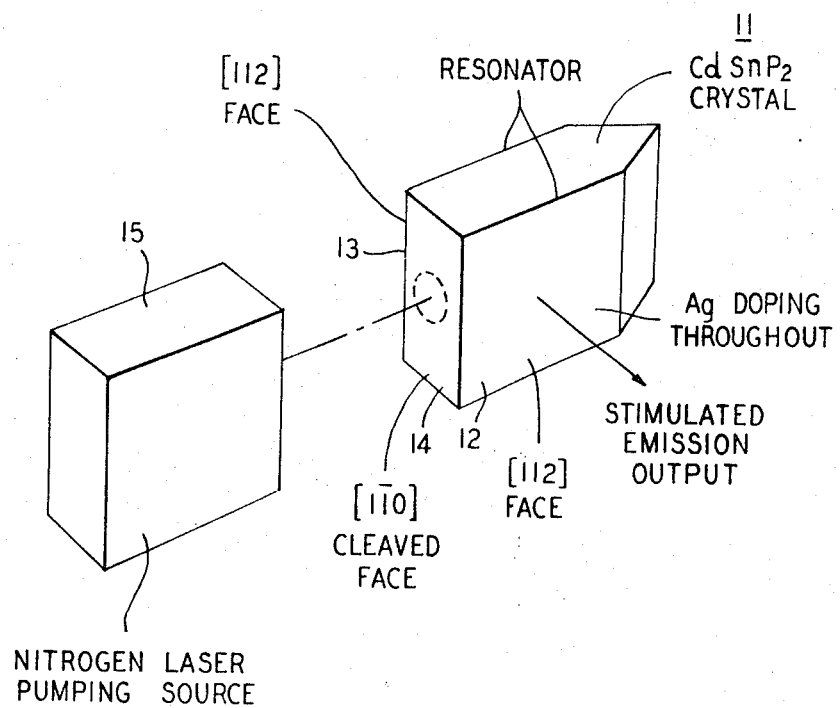
FIG. 1 is a partially pictorial and partially block diagrammatic illustration of an optically pumped embodiment of our invention.

In the optically pumped embodiment of FIG. 1, a crystal 11 of silver-doped cadmium tin phosphide is grown as described hereinafter from a solution including 0.1 to 1.0 mol percent of silver. It is found that the crystal 11 is a platelet about 8.0 millimeters long and has very well defined crystalline faces [112] about 0.2 millimeter apart which are parallel and therefore provide reflectors 12 and 13 for a Fabry-Perot resonator. At least one of the remaining faces is cleaved to provide a surface through which crystal 11 can be optically pumped. For example, crystal 11 was cleaved to expose a planar [1$\bar{1}$0] face about 2.0 millimeters high through which it was optically pumped by the beam from a pulsed nitrogen laser pumping source 15. The wavelength of radiation from source 15 was about 0.3371 micrometer (3,371 Angstrom units). Pumping lasers of this type are now well known in the laser art.

In operation, narrow-line laser emission has been observed at the moderate pumping power threshold of about 50 kilowatts per square centimeter at 20 degrees Kelvin. It should be noted that the mounting and cooling apparatus for crystal 11 to achieve this temperature is conventional and is not shown. The foregoing threshold for laser action compares favorably with other intensively studied laser materials in that this threshold pumping radiation is about four times lower than that for optically pumped indium phosphide (InP) lasers.

When $CdSnP_2$:Ag crystals are grown, cleaved or otherwise formed to have Fabry-Perot cavities, narrow-line laser emission is observed. We optically pumped a cleaved [1$\bar{1}$0] face, using the natural [112] faces to form a Fabry-Perot resonator. The experimental data were measured for pump intensities respectively slightly below and 15 percent above threshold of about 50 kW/cm$^2$. Single frequency laser operation is readily obtained, indicating a homogeneously broadened gain mechanism and negligible spatial "hole burning."

Examination of the laser output as the pumping power was increased above threshold without damaging crystal 11 showed that the stimulated emission becomes highly efficient at pumping power levels of the range commonly used in prior optically pumped semiconductor lasers.

Although the optically pumped laser of FIG. 1 has many attractive characteristics, it is of course desirable to have forms of this laser which need not be pumped by high power pulsed laser sources such as source 15.

Figure 2:
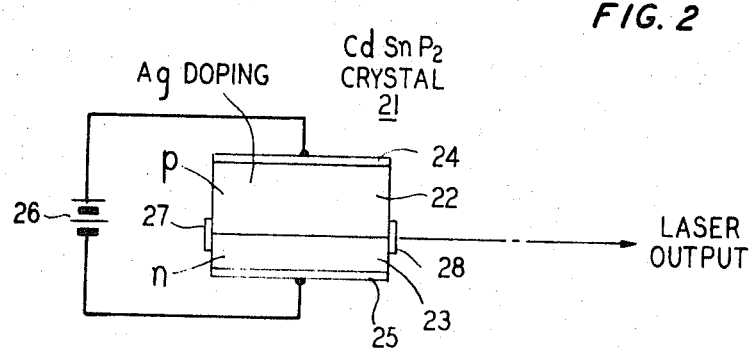
FIGS. 2 through 4 are partially pictorial and partially schematic illustrations of various p-n junction injection lasers according to our invention.
Figure 3:
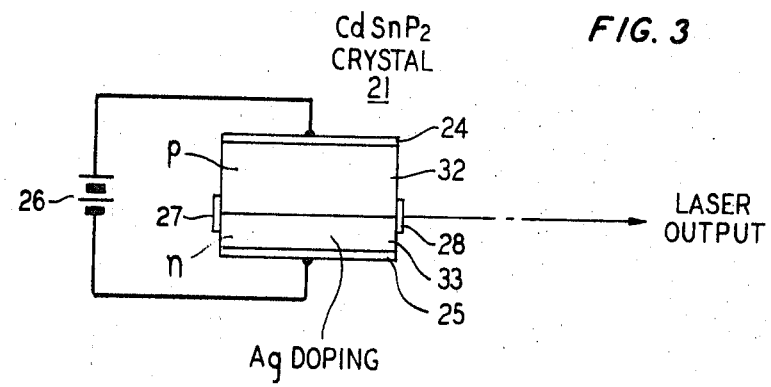
Figure 4:
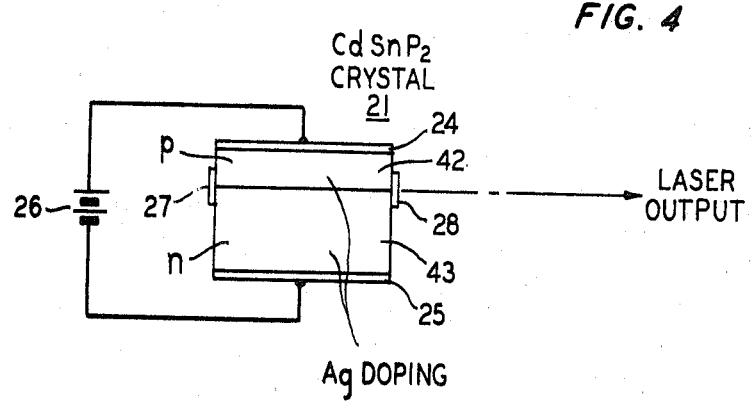

Accordingly, our studies of the role of silver doping in a cadmium tin phosphide laser suggest that a visible injection laser can be made as shown in any of FIGS. 2 through 4.

In the embodiment of FIG. 2, a cadmium tin phosphide crystal platelet 22 with silver doping is grown from a solution containing 0.1 to 1.0 mol percent of silver by the technique described hereinafter. This platelet is made p-type by drifting lithium or sodium impurities through it or by including them as dopants in the growth solution or by diffusing them in through a lower surface of crystal 22.

Next, a layer 23 of cadmium tin phosphide without silver doping and of n-type conductivity is grown by liquid-phase epitaxy or solution epitaxy techniques familiar in the art. Typically, a p-type crystal 22 is suspended in a supersaturated solution of $CdSnP_2$ in tin, which solution contains a suitable n-type dopant, such as tellurium. The n-type layer 23 then grows on crystal 22. A p-n junction is thereby formed between the crystal regions 22 and 23. Other growth techniques include diffusion, tipping, and vapor phase epitaxial growth.

The top and bottom surfaces are polished and etched to provide surfaces for electrode contacts. Electrode contacts 24 and 25 are bonded to regions 22 and 23, respectively, by known techniques and are connected to the positive and negative terminals of direct current pumping source 26. Opposite faces, optionally, cleaved [1$\bar{1}$0] faces, of the crystals 22 and 23 orthogonal to the junction plane form the resonator and, optionally, may be provided with reflective coatings 27 and 28.

In operation, this laser is expected to exhibit its stimulated emission primarily on the p-type side of the junction in the pressence of the silver doping and to experience the advantages of low-threshold and efficiency characteristic of the embodiment of FIG. 1.

The embodiment of FIG. 3 differs from the embodiment of FIG. 2 in that the initial crystal platelet 32 is doped to be p-type like crystal 22 of FIG. 2 but without any initial silver doping impurity being added. The crystal 33 grown, by any of the above-mentioned techniques, on the lower surface of platelet 32, has a substantial silver doping included, illustratively 0.1 to 1.0 mol percent in the solution from which growth is accomplished. The rest of the device is fabricated as in FIG. 2.

In the operation of the laser of FIG. 3, again, and in part dependent on the validity of various possible theories of the role of silver discussed hereinafter, it is believed that the laser of FIG. 3 will also exhibit low threshold and efficiency comparable to that of the preceding embodiments.

The laser of FIG. 4 differs from the lasers of FIGS. 2 and 3 in that both crystalline regions 42 and 43 have silver doping included, as described hereinbefore. The laser of FIG. 4 is otherwise fabricated in the same manner as the laser of FIG. 3. Any of the aforementioned structures depicted in FIGS. 2 through 4 can be fabricated by solution epitaxy techniques wherein a p-type Ag-doped $CdSnP_2$ crystal is suspended in a supersaturated solution of $CdSnP_2$ in Sn. The solution contains a suitable n-type dopant and silver. Growth of an n-type layer on the original p-type crystal then occurs. The p-n junctions can be alternately made by tipping, diffusion, and vapor phase techniques.

The growth technique for our crystals may be more completely described as follows. Crystals of $CdSnP_2$ can be grown successfully from dilute solutions of $CdP_2$ in tin in the 90 to 99 mol percent Sn composition range in sealed quartz ampoules, consistent with our previous description of silver concentration in the starting solution. See our article in *Materials Research Bulletin*, Vol. 6, p. 303, at p. 306 forward (1971). Cooling rates of from 50°–80° centigrade per day have produced single crystal platelets measuring $8.0 \times 2.0 \times 0.2$ mm$^3$. Larger crystals have been grown at slower cooling rates. The above technique yields crystals that tend to grow skeletal with the [112], [110] and [111] faces predominant. No attempts have been made to control nucleation or to seed the solution. Separation of the crystals from the Sn is made by dissolving the Sn in liquid Hg at 200 degrees centigrade in a period of ten minutes. Residual Hg is removed in dilute nitric acid. Several crystals were spectrochemically analyzed by emission and the major observable impurity identified as Hg. It is unknown at this time whether the Hg so detected is a result of entrapment as second phase or present in solid solution due to diffusion. The former situation would appear to be the most likely.

Single crystals of $CdSnP_2$ grown from solution as described above are relatively pure (free electron concentration of about $1 \times 10^{17}$ per cubic centimeter, a concentration of detectable impurities other than Ag below $10^{17}$ cm$^{-3}$, and silver concentration about $1 \times 10^{18}$ cm$^{-3}$) and have served as a convenient prototype II–IV–$V_2$ semiconductor for investigations of electrical and optical properties. These single crystals are sufficiently large to permit optical studies using polarized light.

Crystals of $CdSnP_2$ doped with silver are n-type with resistivities $\sim 1$ $\Omega$-cm. It is not presently known whether Ag is a donor but is present in insufficient quantities to dominate the residual impurities, or whether Ag is an acceptor and is tending to compensate the residual donors. Silver-doped crystals display an efficient luminescence with several sharp photoluminescence lines when stimulated emission is not occurring.

At low excitation levels, there are four prominent photoluminescence bands at 1.004, 1.026, 1.072 and 1.124 micrometers. At high excitation levels the 1.004 micrometer band grows linearly in the excitation intensity and the other three bands rapidly saturate.

At the very high excitation levels available with a pulsed nitrogen laser, a new line, superlinearly related to pump intensity, appears in the luminescence spectra.

Without wishing to limit our invention in any way, we wish to offer the following tentative explanation of the laser action. From a preliminary study of the magnetic field induced shift in wavelength of the spontaneous and stimulated emission, the recombination mechanism is identified as band-to-band, that is, an electron from the conduction band recombines with a hole from the valence band, in a regime in which electron-plasmaron coupling is dominant.

More specifically, a study of the shift of the wavelength of the stimulated emission in magnetic fields up to 100 kG reveals that the mechanism producing this efficient emission in $CdSnP_2$:Ag is the direct radiative recombination of electrons and holes interacting in a many-body, plasma regime. The qualitative features of the stimulated emission spectrum resemble those observed in nominally pure GaAs and InP. The recombination mechanism which we have identified in $CdSnP_2$:Ag is related to the many body screening effects, but differs in principle from the exciton-exciton scattering mechanism, which has been proposed to explain stimulated emission in the previously mentioned binary crystals.

We identify the recombination mechanism by observing the effect of magnetic field on emission wavelength. Thus, in material with negligible carrier concentration the energy gap will increase as $\frac{1}{2}\hbar\omega_c$, where the cyclotron frequency $\omega_c$ increases linearly in the magnetic field at a rapid rate due to the light electron mass. On the other hand, the energy of a single exciton shifts only as $H^2$ for small H and approaches a linear dependence at fields well above the critical field $H_o = \frac{1}{2}\hbar\omega_c/R$, where R is the exciton Rydberg. $H_o$ is about 50 kG for InP, GaAs, or $CdSnP_2$. In the exciton-exciton scattering mechanism one exciton is annihilated and one exciton is promoted to an excited state. Hence, the emitted photon is down-shifted in energy by something less than one Rydberg relative to the energy of a free exciton. For fields below a few $H_o$, the exciton Rydberg increases linearly, and since the exciton energy itself shifts only as $H^2$, the photon emitted due to the exciton-exciton scattering must shift to lower energy. This process is thus immediately excluded for $CdSnP_2$ since the observed shift with magnetic field (see FIG. 3) is to higher energy.

We did not observe efficient stimulated emission in "nominally pure" $CdSnP_2$, which is in our case n-type with $\sim 10^{18}$ or more carriers per $cm^3$. There are indications that the density of sites for nonradiative recombination is much reduced in the Ag doped material. Thus, the Ag may not be acting primarily as a compensating acceptor but may be importantly affecting the overall crystal quality by altering growth conditions.

We claim:

1. A laser of the type comprising a crystalline semiconductive body, means for pumping said body to enable the stimulated emission of radiation, and means for resonating radiation emitted in said body to stimulate the emission of said radiation, said laser being characterized in that said body is a body of cadmium tin phosphide doped with silver to lower the threshold of stimulated emission relative to the threshold in cadmium tin phosphide without intentional doping.

2. A laser of the type claimed in claim 1 in which the body of cadmium tin phosphide is oriented to facilitate optical pumping, the means for resonating radiation comprise [112] faces of said body, and the means for pumping said body include a source of a beam of optical radiation, providing a photon energy exceeding the bandgap energy of said body.

3. A laser of the type claimed in claim 1 in which the cadmium tin phosphide body includes a p-type region and an n-type region making a junction with said p-type region, at least one of said regions including silver as a dopant substantially throughout said region, and the means for pumping includes electrode connections to said regions and means for supplying current through said electrodes to said junction, said resonating means being oriented with an axis along the plane of said junction.

4. A laser of the type claimed in claim 3 in which the p-type region includes the silver dopant.

5. A laser of the type claimed in claim 3 in which the n-type region includes the silver dopant.

6. A laser of the type claimed in claim 3 in which both the p- and n-type regions of the cadmium tin phosphide body include silver as a dopant substantially throughout both of them.

* * * * *